3,558,207
HOLOGRAM SYSTEM EMPLOYING INCOHERENT LIGHT
Harvey R. Worthington, Jr., Cambridge, Mass., assignor, by mesne assignments, to Searle Medidata Inc., Waltham, Mass., a corporation of Delaware
Filed Dec. 6, 1966, Ser. No. 599,466
Int. Cl. G02b 27/00
U.S. Cl. 350—3.5                                  5 Claims

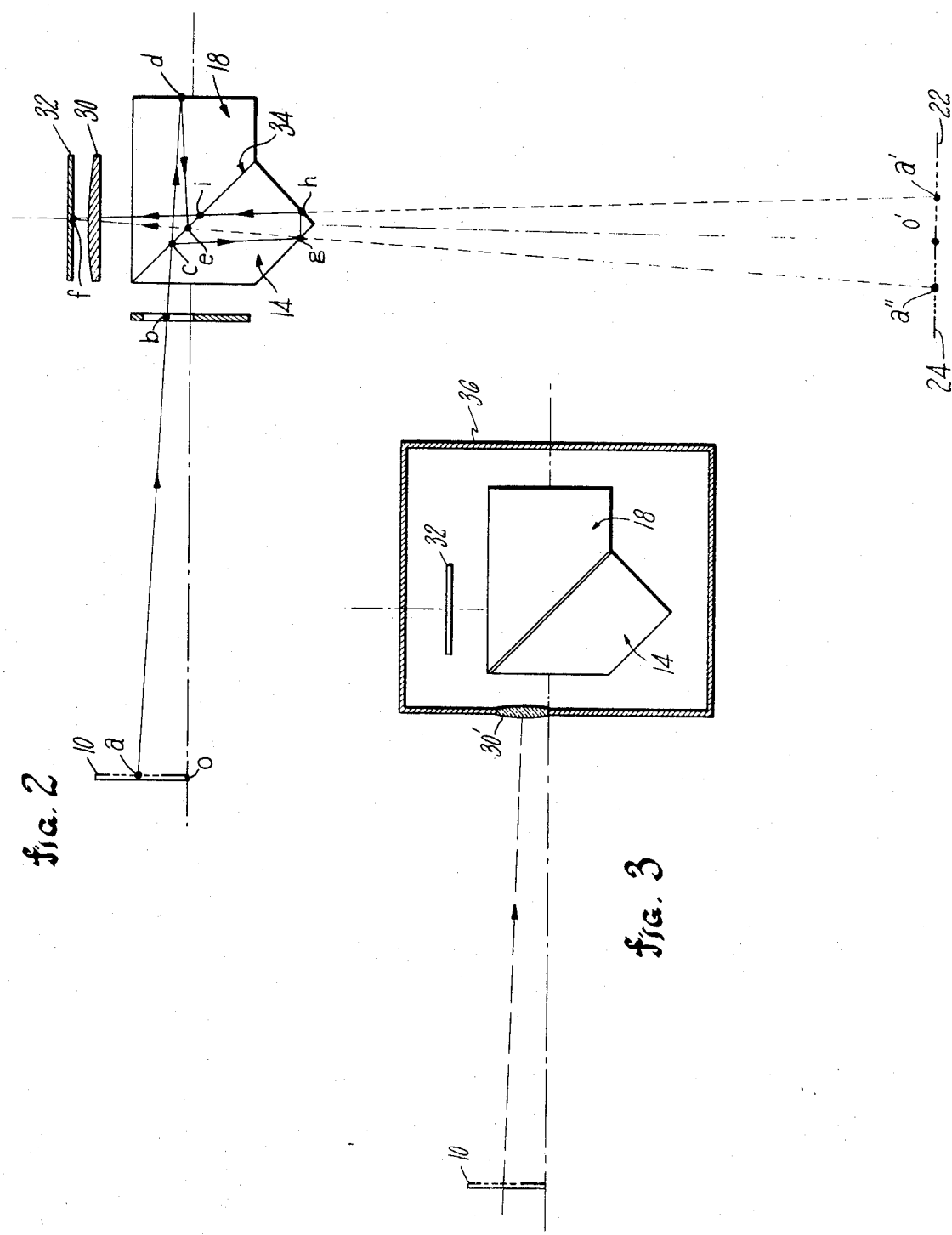

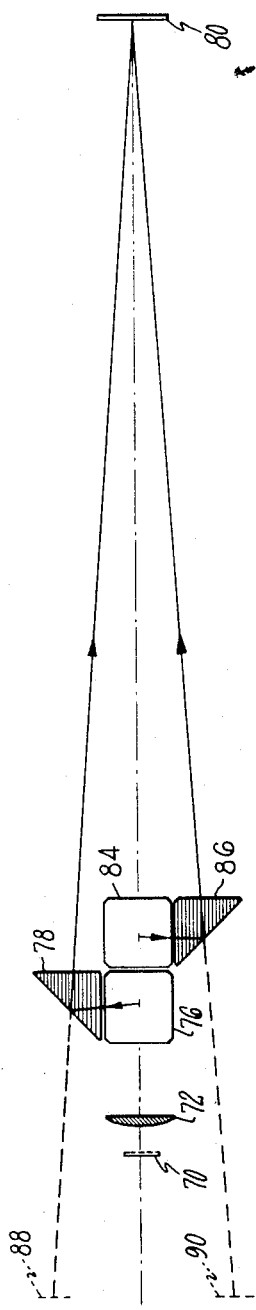
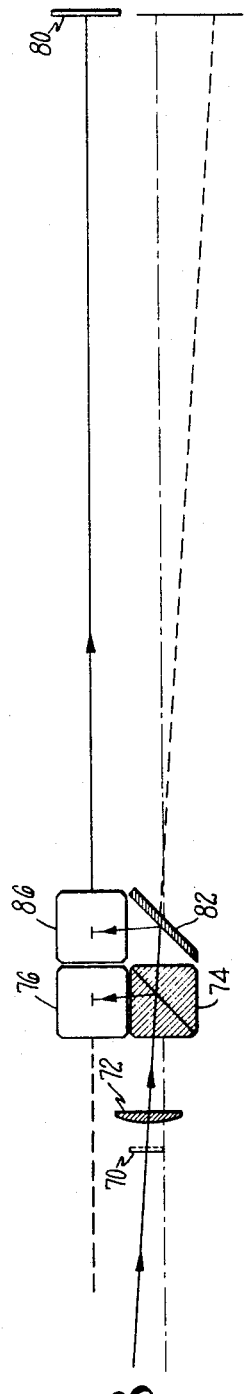
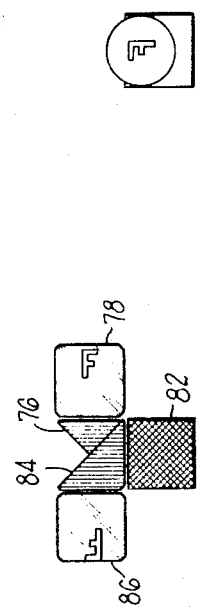
fig. 4A  fig. 4B  fig. 4C  fig. 4D  fig. 4E

United States Patent Office 3,558,207
Patented Jan. 26, 1971

ABSTRACT OF THE DISCLOSURE

Apparatus for producing a hologram utilizing a non-coherent light source. A unitary prism system is operative to divide the light from each point of an object into two separate beams and to direct the separate beams to a common region of a photosensitive surface to produce thereon a hologram of each object point.

---

This invention relates to holograms and, in particular, to means whereby holograms may be produced with light from an object illuminated by a broad, non-coherent source. In a specific embodiment of this invention a novel prism assembly for producing holograms is disclosed.

The hologram of an object is a record of the waves scattered by the object when it is illuminated by essentially monochromatic light. In particular, the hologram is a record of the scattered waves that is produced in such a way that it contains information about both the phase and the amplitude of the waves. A transparent photographic record of the waves pattern will yield an image of the original subject when placed in the path of a suitable beam of light. In other words, the diffraction pattern of the hologram under suitable conditions will consist, in part, of an image of the object that produced the hologram. Such an image is called a reconstructed image.

In the conventional hologram system the light from a coherent source is divided into two beams which travel by different paths to reach the hologram film. One of the beams is used to illuminate the object, which is inserted in the path thereof; the other serves as a so-called reference beam. The scattered waves from the object combine with the reference beam to produce a complex interference pattern, which is recorded on the film and is called the hologram of the object. Such a system is essentially an interferometer with the object in one of the two paths.

The devices of this invention also, necessarily, use an interferometer arrangement to produce the holograms, but they differ from the conventional devices in the useful and novel respect that the object is not incorporated into the interferometer system but is placed ahead of it. The light from each point of the object enters the interferometer system and is divided into two beams which travel by separate paths to reach the film, where they interfere to produce an elementary hologram representing the object point from which they came. If the illumination of the object is incoherent from point to point, then each point of the object may act separately in this way to produce its own elementary hologram, independently of all other points. The assemblage of such elementary holograms for all object points constitutes the hologram of the object.

The condition that the illumination of the object be practically non-coherent is a necessary condition in this method of hologram production, and it is a novel feature of this invention.

Another necessary condition is that the elementary holograms for different points of the object be made distinguishable from one another, and this requirement leads to novel designs for the interferometer systems. In the preferred embodiments of this invention the elementary holograms resemble sinusoidal gratings, and each is distinguishable by either a difference in orientation or a difference in spatial frequency or by both.

The fact that the illumination of the object can be non-coherent constitutes one of the important advantages of this invention. It eliminates the need for intense coherent source such as a laser, which is the only kind of source that is really practical for prior art systems. It thus permits holograms to be made at any wavelength for which a broad, incoherent, quasi-monochromatic light source of reasonable power is available, including wavelengths in the ultraviolet region. One of the main objects of this invention is to produce holograms with light from a broad incoherent source of illumination.

A luminous body is naturally incoherent from point to point and, hence, can produce a hologram with its own light, provided that a narrow-band filter is used to render the light quasi-monochromatic. Another object of this invention, therefore, is to produce holograms of luminous bodies.

The interferometer systems of this invention may be regarded as devices for forming two images of the object to act as the apparent sources of the pairs of elementary beams that interfere to produce the elementary holograms. It is, therefore, another object of this invention to produce holograms by using two images of an incoherent object as the apparent sources of the interfering beams.

In the devices of this invention no reference beam is required, since the only light that is used in producing the hologram is light that comes from the object. One of the objects of this invention is to produce holograms without the aid of a reference beam.

Elimination of the reference beam results in many advantages. On is that the object may then be remote from the hologram system. Hence, a hologram system analogous to a camera can be made. Another object of this invention is to produce what may be termed a hologram camera.

Another advantage of eliminating the reference beam is that the object need not be kept extremely still during the exposure period. In a conventional system when an opaque object is used, a mirror must be placed nearby to provide the reference beam. The back-scattered beam from the object is combined with the reflected beam from the reference mirror to produce the hologram. In that arrangement an axial displacement of the object relative to the mirror will change the relative phase angle of the two waves, which can obliterate the hologram pattern if the displacement much exceeds three millionths of an inch. In the systems of this invention no such critical tolerances are imposed. Instead, the positional tolerances are substantially the same as those for an ordinary photographic subject. One object of this invention is thus to eliminate the severe restrictions upon motion of the subject.

Other objects and advantages of this invention will be apparent from the specifications and from the accompanying drawings which illustrate preferred embodiments of the invention.

FIG. 2 shows a cross-sectional view of the system of FIG. 1 with the ray paths indicated more fully.

FIG. 3 shows a variant of the system in FIGS. 1 and 2.

FIGS. 4A, 4B, 4C, 4D and 4E show an additional embodiment of the invention having a different prism assembly.

Figure 1:
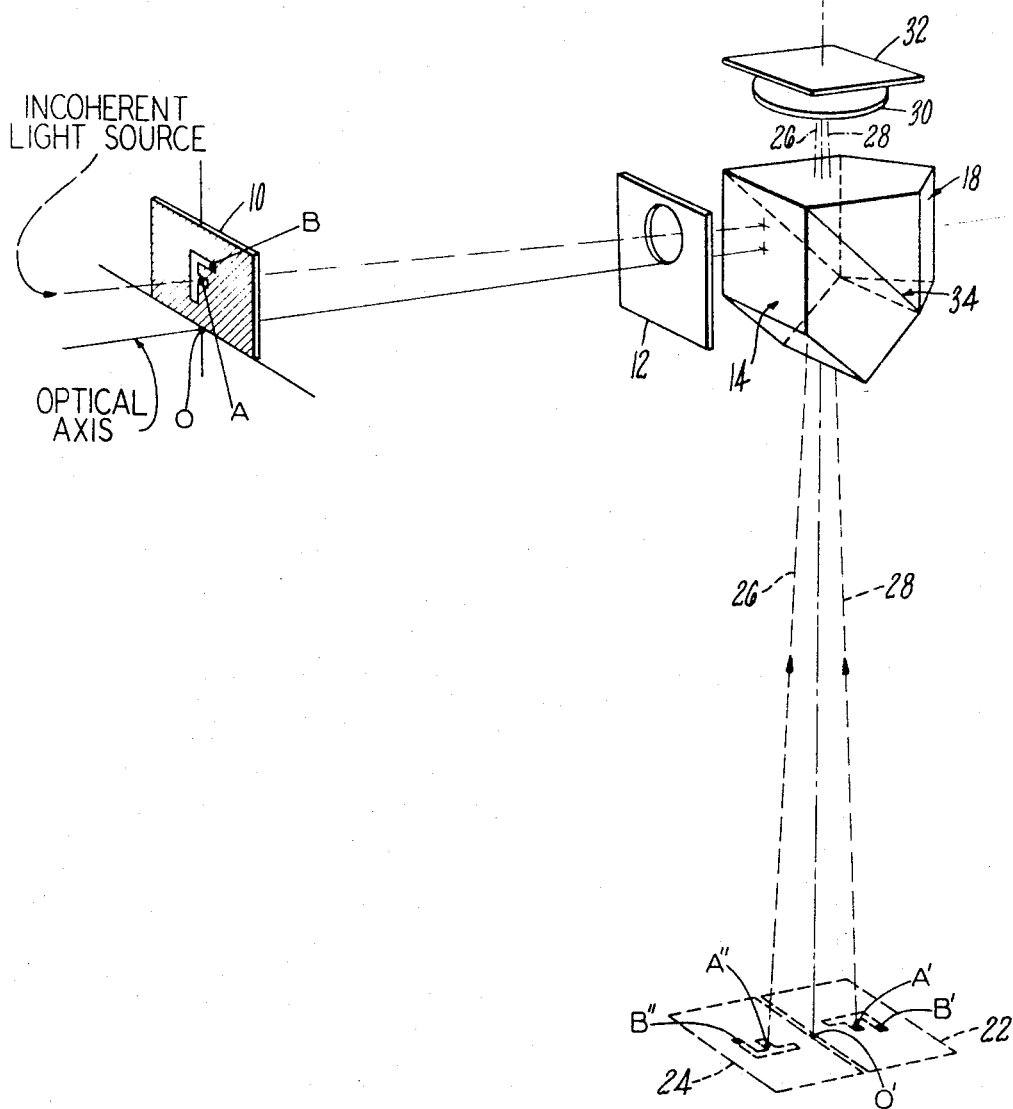
FIG. 1 shows one embodiment of this invention in a perspective view that serves to illustrate the principle.

FIG. 1 depicts a preferred embodiment of the invention in the form of a hologram camera. The object 10 is shown as a letter "F" which, for the purposes of illustration, is assumed to be printed upon film as a clear letter in an opaque background. The source of illumination is located to the left of the object and is a broad incoherent, quasi-monochromatic source such as a filtered mercury arc. The illumination of the object thus provided is non-coherent in the sense that the regions of coherence, although necessarily finite, are at least as small as the intervals to be resolved in the object plane.

Light from the object passes through the entrance aperture 12 of the hologram camera and enters a novel prism system 14, 18 with a partially refflective coating 34 between. The effect of the prism system in FIG. 1 is to form two mirror images 22, 24 of the object that act as the apparent sources of beams of light 26, 28 that emerge from the top of the prism assembly. Those beams are collimated by a field lens 30 before striking the photographic film 32, where they produce the desired hologram pattern of the object. It is to be noted that the two mirror images 22, 24 of the object form a composite figure which is symmetrical with respect to the point O'. This inverse relationship results from the fact that one image (22) has been inverted and the other (24) has been reverted.

The manner in which the elementary holograms are formed may be seen by regarding the mirror images 22, 24 as the immediate sources of the interfering beams and ignoring the presence of the prism assembly. For example, consider the related points A' and A" that occur in images 22 and 24, respectively. Since both A' and A" are images of the point A in the object 10, they are coherent with each other, and their associated elementary beams can therefore interfere to produce an elementary hologram. Likewise, the related points B' and B" are two images of the point B in the object, and their associated elementary beams can interfere to produce an elementary hologram. Thus, every point in the object will produce its own elementary hologram.

The need for non-coherent illumination of the object may be explained with aid of the illustrative points A and B in FIG. 1. Suppose that, contrary to specification, the points A and B were coherent with each other. Then the points A', A", B' and B" in the mirror images 22, 24 would all be coherent, and the beams from those points could interfere in every possible combination. Thus, in addition to the desired combinations A' A", and B' B", there would be the undesirable combinations A' B', A' B", A" B', and A" B". These undesirable combinations would produce spurious holograms which, in turn, would produce spurious image points in the reconstructed image. Such spurious interactions must be avoided, and they are avoided by making the illumination of the object substantially non-coherent.

Substantially non-coherent illumination of the object may also be achieved by illuminating each point of the object separately and sequentially in time.

The character of the elementary hologram patterns may also be accounted for conveniently with the aid of FIG. 1. In that figure the object 10 is in its preferred position, at the front focal plane of the field lens 30, so that the divergent beams that appear to come from points A' and A" are collimated by the field lens 30 and reach the film 32 as a pair of plane waves. Those two plane waves intersect at an angle and therefore produce an interference pattern having the form of a sinusoidal grating. Likewise, the two beams that appear to come from points B' and B" produce a sinusoidal grating pattern. It is evident that the interference fringes for points B' B" must differ in orientation from those for points A' A", because the axis B' B" differs in orientation from the axis A' A". Thus, the azimuthal angle of a point in the object plane is represented by the orientation of the fringe lines in its elementary hologram. It will be evident also to those well versed in optics that the interference pattern for points B' B" will have more fringes per unit length than does that for points A' A", because the spatial frequency for such a pair of points is approximately proportional to the distance between the two points of the pair. And, since the two mirror images 22 and 24 are symmetrical with respect to the point O', the spatial frequency for a pair of related points such as A' A" is likewise proportional to the radial displacement OA' or OA" and hence proportional also to OA in the object plane. Thus, the radial coordinate of a point in the object plane relative to the point O is represented by the spatial frequency of the fringes in its elementary hologram.

It will be observed in FIG. 1 that the object 10 lies entirely to one side of the optical axis and that, by virtue of that displacement, the two mirror images 22, 24 are prevented from overlapping. This condition must be observed in order to obtain a satisfactory reconstructed image, because there will actually be two reconstructed images, corresponding exactly to the two mirror images 22, 24, as will be shown in FIG. 6. If the two mirror images are permitted to overlap, then the two reconstructed images also will overlap, which is clearly unsatisfactory.

It is apparent to those skilled in the art that in FIG. 1 the roof prisms may be replaced by mirrors and the beam-splitter prism may be replaced by a plain beam-splitter mirror.

FIG. 2 is a cross-sectional view of the system in FIG. 1, illustrating the operation of the prism system by means of a ray diagram. The central rays for the two elementary beams for a single object point are shown, namely, the rays abcdef and abcghif. The incident ray abc is partially transmitted and partially reflected by the reflective coating 34 at point c. The transmitted beam passes on to the rear prism, suffers a double reflection at point d, returns and suffers a partial reflection at point e, and passes on to the hologram film 32 to arrive at point f. This ray will appear to have come from a point a" in the left-hand mirror image 24 of the object. The beam reflected at point c travels downward to the bottom prism, is reflected at point g and again at point h, returns to point i, is partially transmitted, and passes on to point f. This ray will appear to have come from a point a' in the right-hand mirror image 22 of the object.

It may be noted that each of the two beams undergoes one reflection and one transmission, and hence the two arrive at the film 32 in equal strength, which is desirable. It will also be seen that there must be two superfluous beams emerging from the first face of the prism, since the beam de is partially transmitted in that direction at e, and the beat hi is partially reflected in that direction at i. Thus, apart from any losses due to absorption of power, there is a 50% loss of power in this prism assembly that might be avoided in a system of a different design. But, in order to avoid this loss of power, it is necessary to sacrifice the compactness of the design.

FIG. 3 shows a variant of the system described in FIGS. 1 and 2. The prism assembly shown in cross section is placed in an enclosure 36 which also contains film 32. The only significant difference is that the field lens 30' is placed at the entrance of the prism system instead of at the exit. As before, the preferred position of the object 10 is at the front focal plane of the field lens 30'. The effect of the lens in this case is to collimate the elementary beams before they enter the prism system instead of afterwards, which may be preferable in principle but is of little importance in practice, because the degree of divergence of the beams is small.

Another variant of the design is obtained by simply omitting the field lens 30' entirely. In that case the interference fringes in an elementary hologram will no longer be quite straight, parallel lines, but they will approximate that configuration adequately, provided that the ray angles for all rays are small angles.

The hologram systems shown in FIGS. 1, 2, and 3 will generally have a very small angular field, because otherwise the interference pattern may be too fine to be resolved. For example, if the angle of incidence of the ray ab in FIG. 2 is 1°, and if the light has a wavelength of 5461 A. (Mercury green line), the spatial frequency of the interference pattern for point a will be about 64 lines/mm., which requires a high resolution film for efficient recording. An object 1° wide with its center displaced 1° from the axis will therefore involve spatial frequencies as high as 100 lines/mm. Similarly, an object 10° wide with its center displaced 10° from the axis will require a film that can record 1000 lines/mm. efficiently which means a special spectrographic film.

To increase the angular size of the object without increasing the resolving power of the film supplementary lenses may be used. For example, a telescopic lens system can be used backwards to reduce the apparent angular size of a large object to a small value.

FIGS. 4A through 4E show in plain view an additional embodiment of the invention. Details of the illuminating system have been eliminated for simplicity.

In FIGS. 4A and 4B, top and side views of the assembly respectively, the scattered beam from the object 70 is directed through field lens 72 to a beam-splitter prism 74 where a portion is passed directly through while another portion is directed upward to a right angle prism 76. The beam is directed by prism 76 to right angle prism 78, and then forward by prism 78 to hologram film 80.

The portion of the beam which passes through the beam splitter 74 impinges on mirror 82 where it is deflected upward to right angle prism 84, and then to right angle prism 86, where it is deflected forward to hologram film 80.

Mirror images of the object are shown by reference numerals 88 and 90.

FIGS. 4C and 4D show respectively the entrance face and exit face of the prism system. In FIG. 4D the images of the object, the letter F, are as seen looking into the exit apertures of prisms 78 and 86.

FIG. 4E illustrates the object as seen looking backwards through field lens 72.

While not shown, a variant of the system of FIG. 4 is readily apparent to those skilled in the art. In this variation a projection lens is inserted between the object and the beam-splitter prism in place of the field lens, and field lens are inserted in the path of each image between the exit prisms and the hologram film. Thus the images that serve as the apparent sources of the interfering beams at the film are projected images. They are projected through the beam-splitter prism and appear as "real" images in the space beyond the prism system. As in the previous figures there are mirror images of everything that lies ahead of the beam splitter, but it is the projected images that would be seen from the position of the hologram and would appear to be a pair of "objects."

Figure 5A:
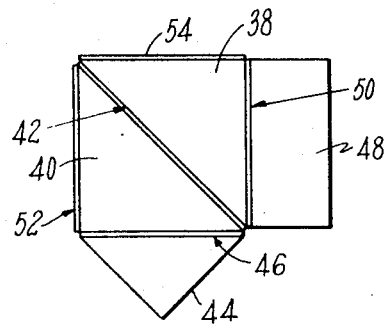
FIGS. 5A, 5B and 5C show, respectively, a side view, an end view and a bottom view of a novel prism system.
Figure 5B:
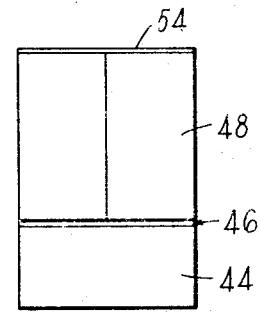
Figure 5C:
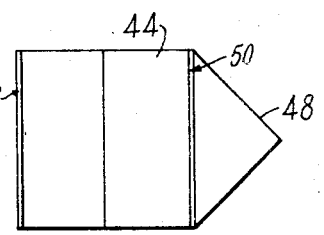

FIG. 5 shows a prism assembly which may be used in place of the prisms of FIGS. 1, 2 and 3. The prism assembly consists of a conventional beam-splitter prism with roof prisms attached to two of its faces.

In FIG. 5 the beam-splitter prism is composed of two right-angle prisms 38 and 40 joined together to form a cubical prism with a partially reflecting coating 42 in the diagonal plane. A third right-angle prism 44 is attached to one face of the beam-splitter by a layer of cement 46 with an index of refraction that matches the index of the glass in the prisms. A fourth prism 48 is attached to another phase of the beam-splitter by a similar layer of cement 50. The entrance and exit faces, respectively, of the prism assembly have low reflectance coatings 52 and 54. The prism assembly could be constructed so as to eliminate the cemented junctions 46 and 50, and it was shown in that alternative form in FIGS. 1, 2 and 3. In FIGS. 1 and 2 the low reflectance coatings 52 and 54, were omitted only for the sake of simplifying the diagrams; in practice the coatings would be necessary in those systems.

Figure 6:
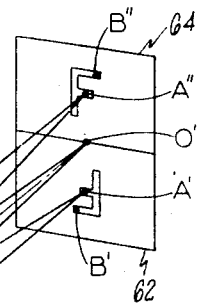
FIG. 6 illustrates the process of reconstruction of the hologram.

The process of reconstructing the image of the object from the hologram is illustrated in FIG. 6. Essentially, the procedure is to form the Fraunhofer diffraction pattern of the hologram in the usual way, i.e., the hologram 56 is illuminated by a beam of monochromatic light which issues from a pin-hole aperture 58, is collimated by lens 60, and is subsequently brought to a focus by a field lens 57. A pair of coplanar images 62 and 64 with central symmetry is produced. Then central spot O' is the unperturbed component of the illuminating beam, and the letters A', B', A" and B" relate the reconstructed image to the mirror images in FIG. 1. If a hologram produced at a wavelength $\lambda$ were to be constructed at a wavelength $\lambda/2$, with the original field lens, the configuration of the two reconstructed images would match the configuration of the two images that acted as the apparent objects in the hologram system. In practice the wavelength for reconstruction may be chosen freely; a longer wavelength simply results in a magnified image.

The hologram technique of this invention does not give a true rendering of the intensity scale of the original object; the intensity pattern of the reconstructed image corresponds to the square of the intensity pattern of the object. This exaggerated contrast may be corrected photographically and is not detrimental.

I claim:
1. Apparatus for producing a hologram of an object comprising:
   means for receiving from said object substantially non-coherent light such that every point of the object is non-coherent with every other point thereof, said means including a unitary prism system comprising:
      a prism having a first surface disposed substantially orthogonally to said non-coherent light;
      a second prism arranged in intimate contact with said first prism;
      a partially reflective surface formed on one of the contacting surfaces of said first and second prisms;
      said first prism and partially reflective surface being operative to divide the light from each point of said object into first and second beams and said first prism also being operative to multiply reflect one of said separate beams internally through said partially reflective surface onto a region of a photosensitive surface;
      said second prism being operative to internally reflect the other of said separate beams off of said partially reflective surface onto said region of said photosensitive surface to produce thereon a hologram of each object point.
2. Apparatus according to claim 1 including a field lens for collimating said separate beams before impinging upon said photosensitive surface.
3. Apparatus according to claim 1 wherein said first and second prism each includes a right angle prism and a roof prism arranged in intimate light transmitting relationship.
4. Apparatus according to claim 1 including
   means for illuminating said object with light which is substantially non-coherent from point to point.
5. Apparatus for producing a hologram of an object comprising:
   means for receiving from said object substantially non-coherent light such that every point of the object is non-coherent with every other point thereof, said means including a unitary prism system having:
      a beam splitter prism operative to divide the light from each point of said object and to transmit a first beam and to reflect a second beam;
a first right angle prism operative to reflect said second beam;
a second right angle prism operative to receive said beam from said first prism and to direct said beam onto a region of a photosensitive surface;
a surface for reflecting said first beam from said beam splitting prism;
a third right angle prism operative to reflect the beam from said reflecting surface;
a fourth right angle prism for receiving said beam from said third prism and for directing said beam onto said region of said photosensitive surface to produce thereon a hologram of each object point.

References Cited

UNITED STATES PATENTS

| 2,925,751 | 2/1960 | Miles | 350—173X |
| 3,415,587 | 12/1968 | Cathey | 350—3.5 |

FOREIGN PATENTS

| 1,094,484 | 12/1960 | Germany | 356—106 |
| 1,358,363 | 3/1964 | France | 350—173 |

OTHER REFERENCES

Stroke et al., "Holography With Spatially Noncoherent Light," Applied Physics Letters vol. 7, No. 9, Nov. 1, 1965, pp. 229–231.

JOHN K. CORBIN, Primary Examiner

U.S. Cl. X.R.

350—173